United States Patent [19]

Minnick

[11] Patent Number: 4,778,820
[45] Date of Patent: Oct. 18, 1988

[54] POLYESTER MOLDING COMPOSITIONS
[75] Inventor: Larry A. Minnick, Bluff City, Tenn.
[73] Assignee: Eastman Kodak Company, Rochester, N.Y.
[21] Appl. No.: 86,997
[22] Filed: Aug. 19, 1987
[51] Int. Cl.$^4$ ............................................. C08K 3/08
[52] U.S. Cl. .................................... 524/439; 524/371; 524/539
[58] Field of Search ............................ 524/371, 439

[56] References Cited
U.S. PATENT DOCUMENTS

| | | | |
|---|---|---|---|
| 3,951,905 | 4/1976 | Sano et al. | 524/399 |
| 3,971,752 | 7/1976 | Aoyama et al. | 524/371 |
| 4,010,145 | 3/1977 | Russin et al. | 528/280 |
| 4,338,243 | 7/1982 | Hecht et al. | 524/287 |
| 4,535,118 | 8/1985 | Pergilly | 524/398 |
| 4,609,721 | 9/1986 | Kirshenbaum et al. | 528/285 |

Primary Examiner—John C. Bleutge
Assistant Examiner—David W. Woodward
Attorney, Agent, or Firm—John F. Stevens; William P. Heath, Jr.

[57] ABSTRACT

A flame-retarded polyester molding composition having improved physical properties comprising
(a) a polyester containing repeating units from terephthalic acid and 1,4-cyclohexane-dimethanol, and
(b) a flame-retardant system comprising about 5-20% by weight of the composition of an aromatic organic compound having at least one aromatic ring in which the compound has sufficient halogen bonded directly to the aromatic ring to provide flame-retardant properties and about 2-8% by weight of the total composition of powdered antimony metal having a particle size of less than about 500 microns.

7 Claims, No Drawings

POLYESTER MOLDING COMPOSITIONS

TECHNICAL FIELD

This invention relates to flame-retarded polyester molding compositions having improved physical properties.

BACKGROUND OF THE INVENTION

This invention is based on the discovery of flame retarded reinforced molding compositions based on poly(1,4-cyclohexylene dimethyl terephthalate) or high melting crystalline copolymers thereof with improved mechanical properties. Generally, polyesters are flame retarded by using brominated organic compounds in combination with antimony oxide. Surprisingly, by replacing the antimony oxide with powdered antimony metal in these formulations, the mechanical properties are greatly enhanced while maintaining the excellent flammability properties. Flame retarded glass fiber reinforced polyester containing the powdered antimony metal has excellent strength, heat resistance, and flammability properties. These materials would find application in the electronics industry where flame retarded materials are necessary.

The use of antimony oxide in combination with brominated organic compounds is well known in the art of flame retarded polymers. Sodium antimonate used in combination with brominated organic compounds and used as a replacement for antimony oxide to flame retard poly(ethylene terephthalate) is disclosed in U.S. Pat. No. 4,338,243. We are unaware of any prior art on the use of powdered antimony metal in combination with brominated organic compounds to flame retard polymers.

DESCRIPTION OF THE INVENTION

According to the present invention, there is provided a flame-retarded polyester molding composition having improved physical properties comprising
(a) a polyester containing repeating units from terephthalic acid and 1,4-cyclohexanedimethanol and having an I.V. of from about 0.5 to about 1.0,
(b) a flame-retardant system comprising about 5-20% by weight of the composition of an aromatic organic compound having at least one aromatic ring in which the compound has sufficient halogen bonded directly to the aromatic ring to provide flame-retardant properties and about 2-8% by weight of the total composition of powered antimony metal having a particle size of less than about 500 microns.

More particularly, according to the present invention there is provided a reinforced, flame-retarded molding composition comprising
(a) a polyester having repeating units from a dicarboxylic acid component and a glycol component, at least 90 mol % of said acid component being terephthalic acid and at least 90 mol % of said glycol component being 1,4-cyclohexanedimethanol, said polyester having an I.V. of from about 0.5 to about 1.0,
(b) about 10-50% by weight of the composition of a reinforcing material comprising glass fibers, and
(c) a flame-retardant system comprising about 5-20% by weight of the composition of an aromatic organic compound having at least one aromatic ring in which the compound has sufficient halogen bonded directly to the aromatic ring to provide flame-retardant properties and about 2-8% by weight of the total composition of powdered antimony metal having a particle size of less than about 500 microns.

In another aspect of the present invention, there is provided a flame-retardant composition adapted for use in polyesters containing repeating units from terephthalic acid and 1,4-cyclohexanedimethanol comprising a halogenated organic compound and powdered antimony metal.

The polyester portion of the molding compositions of the present invention is prepared by conventional polycondensation procedures well known in the art. The polyester, poly(1,4-cyclohexylene dimethylene terephthalate) contains repeating units from a dicarboxylic acid component and a glycol component. The dicarboxylic acid component, a total of 100 mol %, is at least 90 mol % terephthalic acid and the glycol component, a total of 100 mol % is at least 90 mol % 1,4-cyclohexanedimethanol.

The dicarboxylic acid component may contain up to about 10 mol % of other conventional aromatic, aliphatic or alicyclic dicarboxylic acids such as isophthalic acid, naphthalene-dicarboxylic acid, cyclohexanedicarboxylic acid, succinic acid, sebacic acid, adipic acid, glutaric acid, azelaic acid and the like.

The glycol component may contain up to about 10 mol % of other conventional aliphatic or alicyclic glycols such as diethylene glycol, triethylene glycol, ethylene glycol, propanediol, butanediol, pentanediol, hexanediol, and the like.

The polyesters and copolyesters described above should have an I.V. (inherent viscosity) of from about 0.5 to about 1.0, and a melting point of at least 265° C.

The flame-retardant system comprises (1) an aromatic organic compound having at least one aromatic ring having halogen bonded directly to the aromatic ring and (2) a powdered antimony compound. The halogenated compounds are preferably brominated or chlorinated, and most preferably, brominated.

The bromine content, when bromine is present, is at least 25% of the weight of the compound, and the chlorine content, when chlorine is present, is at least 40% of the weight of the compound. In addition, the flame-retardant compound should be substantially stable at up to 300° C. and should not cause degradation of polyester. When the compound contains bromine, the amount of the bromine present in the blend should preferably be between 2-12% by weight of blend, and most preferably 5-10%. When the compound contins chlorine, the amount of the chlorine present should preferably be between 3-20% by weight of blend and most preferably 5-12%.

Representative flame-retardants include decabromodiphenyl ether, octabromodiphenyl ether, ethylene bis-(tetrabromophthalimide), brominated polystyrene, poly(dibromophenylene oxide). Dechlorane plus (the condensation product of two moles of tetrachlorocyclopentadiene and one mole of cyclooctadiene), and the like. Polymeric retardants may have molecular weight up to 200,000 or more.

The flame retardant system further comprises a powdered antimony metal. Such powdered antimony should be of a fine size such as, for example, less than about 500 microns, for complete distribution in the composition. Preferably, the size of the powdered antimony is less than about 150 microns. Powdered antimony metal is commercially available for example, from Alcan Powders and Chemicals, as Alcan 301 antimony powder. The powdered antimony metal should be used in amounts so as to result in about 2-8 wt % of the total molding composition.

Substantially any of the types of glass fibers generally known and/or used in the art are useful in the present invention. Typical types are those described in British Pat. No. 1,111,012, U.S. Pat. No. 3,368,995 and German Auslegeschrift No. 2,042,447. The usefulness of any particular type of glass fiber does not depend on its average length. Thus, the average length of useful fibers covers a wide range. The presently preferred glass fibers have an average length of about ⅛ inch.

Glass filaments made of calcium-aluminum-boron silicate glass, which is relatively free from sodium carbonate, are preferably used. Glass of this type is known as "E" glass; however, where the electrical properties of the reinforced polyesters are not important, other glasses can also be used, for example the glass with a low sodium carbonate content which is known as "C" glass. The diameters of the filaments can be in the range from about 0.003 to 0.018 mm, but this is not critical for the present invention.

The length of the glass filaments and whether they have been spun to give fibers and the fibers in turn have been bundled to give yarns, ropes or hanks or woven to give mats and the like is not critical for the invention.

The glass fiber may be mixed with other conventional fillers such as graphite fibers, aramid fibers, glass beads, aluminum silicate, asbestos, mica and the like, with the total weight of the filler material being about 10-50% by weight of the molding composition.

In addition to the components discussed hereinabove, the blends of this invention may contain additives commonly employed with polyester resins, such as colorants, mold release agents, antioxidants, tougheners, nucleating agents, ultraviolet light and heat stabilizers and the like.

The blends of this invention are prepared by blending the components together by any convenient means to obtain an intimate blend. Neither temperature nor pressure are critical. For example, the polyester can be mixed dry in any suitable blender or tumbler with the other components and the mixture melt-extruded. The extrudate can be chopped. If desired the reinforcing or filling agent can be omitted initially and added after the first melt extrusion, and the resulting mixture can then be melt extruded. The product is especially suitable as an injection molding material for producing molded articles.

The following examples are submitted for a better understanding of the invention.

A composition of poly(1,4-cyclohexylene dimethylene terephthalate) containing 30 wt % glass fiber, 5 wt % of a conventional plasticizer, and 0.5 wt % of conventional antioxidants. (Composition A) was prepared by melt compounding using a single screw extruder. A flame retarded version of this formulation was prepared by adding 10 wt % polydibromophenylene oxide and 3 wt % antimony oxide thereto before the compounding procedure as a control. These blends were injection molded into tensile and flexural test bars using a mold temperature of 120° C. Mechanical and flammability properties were determined on these test bars. V0 flammability ratings at 1/16 and ⅛ inch by the UL Vertical Subject 94 Flammability Test were obtained on the flame retarded formulation. However, the tensile and flexural properties were greatly reduced in the flame retarded formulation (see Table 1). This reduction in properties greatly limits the utility of this composition.

A second flame retarded version of Composition A was prepared by adding 10 wt % polydibromophenylene oxide and 4 wt % sodium antimonate thereto before compounding as another control. This blend was injection molded as above and mechanical and flammability properties were determined on the resulting test bars. V0 flammability ratings were obtained on this formulation at 1/16 and ⅛ inch, but the notched Izod impact strength and heat deflection temperature at 264 psi were lowered. Again, the lowered mechanical properties will limit the utility of this composition.

A series of samples of Composition A were prepared containing 10 wt % polydibromophenylene oxide and 0, 2.5, and 3.5 wt % powdered antimony metal. These blends were compounded and molded as in the examples shown above. Mechanical and flammability properties were determined on the resulting test bars. Surprisingly, these formulations had excellent tensile and flexural properties as compared to the formulation containing antimony oxide (see Table 2). Also, these formulations had excellent notched Izod impact strength and heat deflection temperature at 264 psi as compared to the formulation containing sodium antimonate. The formulation containing no powdered antimony metal had an unacceptable flammability rating with only a slightly improved oxygen index to Composition A. The formulation containing 2.5 wt % powdered antimony metal had a V1 flammability rating with an oxygen index of 25.5. The formulation containing 3.5 wt % antimony metal had a V0 flammability rating with an oxygen index of 26.2.

TABLE 1

EFFECT OF SELECTED FLAME RETARDANT SYSTEMS ON PROPERTIES OF COMPOSITION A

| | | | |
|---|---|---|---|
| Polydibromophenylene oxide, wt % | — | 10 | 10 |
| Antimony oxide, wt % | — | 3 | — |
| Sodium antimonate, wt % | — | — | 4 |
| Tensile Strength, psi | 20,970 | 8,790 | 14,270 |
| Elongation @ break, % | 5 | 2 | 3 |
| Flexural Strength, psi | 31,520 | 16,720 | 22,330 |
| Flexural Modulus, psi | 1,161,000 | 1,362,000 | 1,368,000 |
| Notched Izod Impact, ft-lb/in. 23° C. | 1.9 | 1.4 | 0.8 |
| Unnotched Izod Impact, ft-lb/in. 23° C. | 14.3 | 3.2 | 5.4 |
| Heat Deflection Temperature @ 264 psi, °C. | 259 | 257 | 250 |
| UL Vertical Subject 94 Flammability @ 1/16 in. | — | V0 | V0 |
| @ ⅛ in. | — | V0 | V0 |
| Oxygen Index, % | 20.2 | 29.0 | 26.4 |

TABLE 2

EFFECT OF SELECTED FLAME RETARDANT SYSTEMS ON PROPERTIES OF COMPOSITION A

| | | | |
|---|---|---|---|
| Polydibromophenylene oxide, wt % | 10 | 10 | 10 |
| Antimony metal, wt % | — | 2.5 | 3.5 |
| Tensile Strength, psi | 18,640 | 17,880 | 17,230 |
| Elongation @ break, % | 4 | 4 | 4 |
| Flexural Strength, psi | 28,130 | 27,690 | 26,820 |
| Flexural Modulus, psi | 1,253,000 | 1,281,000 | 1,317,000 |
| Notched Izod Impact, ft-lb/in. 23° C. | 1.3 | 1.8 | 1.8 |
| Unnotched Izod Impact, ft-lb/in. 23° C. | 10.4 | 8.5 | 5.5 |
| Heat Deflection Temperature @ 264 psi, °C. | 247 | 251 | 256 |
| UL Vertical Subject 94 | — | V1 | V0 |

TABLE 2-continued

| | | | |
|---|---|---|---|
| Flammability @ 1/16 in. | | | |
| @ ⅛ in. | — | V1 | V0 |
| Oxygen Index, % | 23.3 | 25.2 | 26.2 |

Properties of compositions discussed herein are measured as follows:

| | ASTM |
|---|---|
| Tensile Strength, psi } | D638 |
| Elongation @ break, % } | |
| Flexural Strength, psi } | D790 |
| Flexural Modulus, psi } | |
| Notched Izod Impact, ft-lb/in. 23° C. | D256 |
| Unnotched Izod Impact, ft-lb/in. 23° C. | D256 |
| Heat Deflection Temperature @ 264 psi, °C. | D648 |
| UL Vertical Subject 94 } | Underwriter's |
| Flammability @ 1/16 in. } | Laboratory |
| @ ⅛ in. } | Method UL-94 |

Oxygen Index, measured in %, is the smallest % oxygen in an oxygen/nitrogen atmosphere that will support a flame for 3 minutes.

As used herein, the inherent viscosity (I.V.) is measured at 25° C. using 0.50 gram of polymer per 100 ml of a solvent consisting of 60% by weight phenol and 40% by weight tetrachloroethane.

Unless otherwise specified, all parts, percentages, ratios, etc. are by weight.

The invention has been described in detail with particular reference to preferred embodiments thereof, but it will be understood that variations and modifications can be effected within the spirit and scope of the invention.

I claim:

1. A flame-retarded polyester molding composition having improved physical properties comprising
   (a) a polyester containing repeating units from terephthalic acid and 1,4-cyclohexanedimethanol and having an inherent viscosity of from about 0.5 to about 1.0 measured at 25° C. using 0.50 gram of polymer per 100 ml of solvent consisting of 60% by weight phenol and 40% by weight tetrachloroethane, and
   (b) a flame-retardant system comprising (I) about 5-20% by weight of the composition of an aromatic organic compound having at least one aromatic ring in which the compound has sufficient halogen bonded directly to the aromatic ring to provide flame-retardant properties and (II) about 2-8% by weight of the total composition of powdered antimony metal having a particle size of less than about 500 microns.

2. A reinforced flame-retarded polyester molding composition having improved physical properties comprising
   (a) a polyester containing repeating units from terephthalic acid and 1,4-cyclohexanedimethanol and having an inherent viscosisty of from about 0.5 to about 1.0 measured at 25° C. using 0.50 gram of polymer per 100 ml of a solvent consisting of 60% by weight phenol and 40% by weight tetrachloroethane,
   (b) about 10-50% by weight of the composition of a reinforcing material, and
   (c) a flame-retardant system comprising (I) about 5-20% by weight of the composition of an aromatic organic compound having at least one aromatic ring in which the compound has sufficient halogen bonded directly to the aromatic ring to provide flame-retardant properties and (II) about 2-8% by weight of the total composition of powdered antimony metal having a particle size of less than about 500 microns.

3. A reinforced, flame-retarded molding composition comprising
   (a) a polyester having repeating units from a dicarboxylic acid component and a glycol component, at least 90 mol % of said acid component being terephthalic acid and at least 90 mol % of said glycol component being 1,4-cyclohexanedimethanol, said polyester having an inherent viscosity of from about 0.5 to about 1.0 measured at 25° C. using 0.50 gram of polymer per 100 ml of a solvent consisting of 60% by weight phenol and 40% by weight tetrachloroethane,
   (b) about 10-50% by weight of the composition of a reinforcing material comprising glass fibers, and
   (c) a flame-retardant system comprising (I) about 5-20% by weight of the composition of an aromatic organic compound having at least one aromatic ring in which the compound has sufficient halogen bonded directly to the aromatic ring to provide flame-retardant properties and (II) about 2-8% by weight of the total composition of powdered antimony metal having a particle size of less than about 500 microns.

4. A reinforced, flame-retarded molding composition according to claim 3 wherein said reinforcing material consists essentially of glass fibers.

5. A reinforced, flame-retarded molding composition according to claim 3 wherein said halogenated organic compound is brominated or chlorinated.

6. A reinforced, flame-retarded molding composition according to claim 3 wherein said halogenated organic compound is brominated.

7. A reinforced, flame-retarded molding composition according to claim 3 wherein said halogenated organic compound is polydibromophenylene oxide.

* * * * *